United States Patent [19]

Bahr et al.

[11] Patent Number: 5,275,774
[45] Date of Patent: Jan. 4, 1994

[54] STARCH TREATMENT PROCESS

[75] Inventors: Kark-Heinz Bahr, Grimbergen; Michael G. Fitton, Brussels; Helmut Koch, Tervuren, all of Belgium

[73] Assignee: Cerestar Holdings, B.V., Netherlands

[21] Appl. No.: 852,179

[22] PCT Filed: Jul. 31, 1991

[86] PCT No.: PCT/GB91/01297

§ 371 Date: May 18, 1992

§ 102(e) Date: May 18, 1992

[87] PCT Pub. No.: WO92/02559

PCT Pub. Date: Feb. 20, 1992

[30] Foreign Application Priority Data

Aug. 7, 1990 [GB] United Kingdom ............... 9017300

[51] Int. Cl.$^5$ .................... B29C 47/00; B29C 45/00; B29K 1/00
[52] U.S. Cl. ..................... 264/211; 106/211; 106/213; 127/32; 264/211.11; 264/328.2; 264/330; 264/101
[58] Field of Search ............ 264/211, 328.18, 211.11, 264/177.11, 349, 328.2, 330, 101; 426/549, 578; 106/210, 213, 211; 127/32; 536/107, 111

[56] References Cited

U.S. PATENT DOCUMENTS

| 3,117,014 | 1/1964 | Klug ..................... 106/213 |
| 3,137,592 | 6/1964 | Protzman et al. .............. 127/32 |
| 3,243,308 | 3/1966 | Barger et al. . |
| 3,265,509 | 8/1966 | Wurzburg et al. . |
| 3,891,624 | 6/1975 | Boonstra et al. ............. 536/107 |
| 4,454,268 | 6/1984 | Otey et al. . |
| 4,673,438 | 6/1987 | Wittwer et al. ............. 264/328.18 |
| 5,043,196 | 8/1991 | Lacourse et al. ............. 106/210 |

FOREIGN PATENT DOCUMENTS

| 654605 | 4/1965 | Belgium . |
| 0118240 | 9/1984 | European Pat. Off. . |
| 1014801 | 12/1965 | United Kingdom . |
| 90/10671 | 9/1990 | World Int. Prop. O. . |
| 90/14938 | 12/1990 | World Int. Prop. O. . |

OTHER PUBLICATIONS

Cereal Chemistry, The American Association of Cereal Chemists, vol. 54, No. 3, ISSN 0009-0352 pp. 436-443, B. Y. Chiang et al. Gelatinization of Starch in Extruded Products, May-Jun. 1977.

Chimia, Association of Swiss Chemists, vol. 41, Injection Moulding of Natural Hydrophilic Polymers in the Presence of Water, R. F. T. Stepto et al, pp. 76-81, Mar. 1987.

Primary Examiner—Jeffery Thurlow
Assistant Examiner—Mathieu Vargot
Attorney, Agent, or Firm—Cushman, Darby & Cushman

[57] ABSTRACT

In a process for extruding or injection moulding starch-containing composition, a substantially transparent product is produced by providing that the starch used contains less than 8% by weight of water, that the water content of the starch in the barrel of the extruder or injection moulding machine is controlled so as to be within the range of from 5 to 20% by weight (based on the weight of the starch) and that water is removed from the composition immediately before the composition leaves the barrel of the extruder or the injection moulding machine so that the water content of the composition passing through the die and/or entering the mould is less than 3% by weight of the starch.

11 Claims, No Drawings

STARCH TREATMENT PROCESS

The present invention relates to a process for treating starch by extrusion or injection moulding and, in particular to a process for producing thermoplastic starch products by extrusion.

The processing of starch in an extruder has been known for many years and there are articles in the literature describing various aspects of the process e.g. Cereal Chemistry 54(3):436–443. In the extruder the starch is subjected to a shearing effect at an elevated temperature resulting in gelatinisation of the starch granules and some degradation of the starch molecules.

Recently, descriptions have appeared in the literature e.g. in European patent 118240 of a process for the injection moulding of starch in which the starch is injected into a mould to produce a shaped starch article. The process described in EP 118240 includes (a) maintaining a composition comprising a starch and water at a water content in the range of from 5 to 30% by weight based on the weight of the composition and heating the composition at elevated pressure to form a melt (b) further heating and plasticising the melt into a molecularly dispersed form (c) injecting the plasticised melt into a mould while maintaining the water content in the 5-30% by weight range (d) cooling down the mould and (e) ejecting the moulded article. This process is suitably carried out in injection moulding equipment.

The starch used in the process of EP 118240 may be chosen from a wide range of commercially available starches e.g. maize, wheat, potato, rice or tapioca starch, the only proviso being that the starch is not chemically modified. The thermomechanical properties of the product of the process are said to be strongly dependent on its water content, the lower limit being defined by a maximum processing temperature of 240° C., which cannot be exceeded if degradation of the starch is to be avoided. The upper limit is determined by the stickiness and distortion of the finished products. Since natural starches generally contain an equilibrium amount of water of about 12% to 20% by weight the use of an untreated starch may fall, depending upon the quantity of substances other than starch in the composition, within the range specified in EP 118240 of 5 to 30% without the need to add more water. We have now found however that a product of improved clarity is obtained if the starting material for the process is a so-called super-dry starch containing less than 8% by weight water and particularly less than 5% by weight. The production of a clear product is especially important for film production.

The invention is applicable to a process in which a starch-containing composition is extruded to produce pellets for subsequent processing as a thermoplastic e.g. by injection moulding, compression moulding or film extrusion or to a process in which the starch-containing composition is processed in an injection moulding machine followed by direct injection into a mould.

According to the present invention a process for extruding or injection moulding a starch-containing composition by feeding the composition either to an extruder which extrudes the composition through a die or to an injection moulding machine which injects the composition into a mould is characterised in that a substantially transparent product is produced by providing that.

(a) the starch which is used contains less than 8% by weight water based on the starch.

(b) the water content of the starch in the barrel of the extruder or the injection moulding machine is controlled so as to be in the range 5 to 20% preferably 7 to 15% by weight of the starch and (c) water is removed form the composition immediately before the composition leaves the barrel of the extruder or the injection moulding machine so that the water content of the composition passing through the die and/or entering the mould is less than 3% by weight of the starch.

For the sake of convenience, the invention will be described in the remainder of this specification by referring to an extruder although it should be understood that this description applies equally as well to an injection moulding machine.

Preferably, the starch which is fed to the extruder contains less than 5 weight % water and suitably contains 2 to 3 weight % water. Starch containing this amount of water is made commercially by the mechanical drying of starch in an explosion proof dryer and the product conventionally finds use in blends with polyethylene.

The water content of the starch in the extruder barrel may be achieved by adding water if necessary. Water may be added to the starch immediately before the starch is fed to the extruder or water may be fed directly to the extruder itself. It is important that the water is not added to the starch too soon before the latter is introduced to the extruder otherwise the beneficial effects of using super dry starch are lost. For this reason it is preferable to add any water directly to the extruder barrel. Although water may be added to give a composition containing more than 20% by weight water based on starch this is unnecessary and only results in more water to be removed in stage (c) of the process.

The water is preferably removed from the starch immediately before it leaves the extruder by means of a vacuum applied to an exit port located at the end of the extruder barrel. The water content of the starch as it leaves the extruder is preferably less than 1% by weight of starch.

The starch which is used in the process of the present invention may be chosen from any of the available starches although it is preferred that the amylose content be low since we have observed that the capacity of the product increases with increasing amylose content of the starch. Regular maize starch (approximately 25% amylose) is a very suitable feedstock for the process.

The temperature maintained in the extruder may be in the range 100° to 200° C. but as a minimum degradation of the starch is desirable it is preferred that the temperature be in the range 130°-150°0 C.

The starch which is extruded in accordance with the present invention may include other substances depending upon the purpose for which the extruded product is required. It is generally prepared to provide a plasticiser for the starch e.g. a polyethylene glycol, glycerol, sorbitol, erythritol, propylene glycol, pentaerythritol, or a glycerol ester. A lubricant such as a lipid or a metal stearate may also be present.

The plasticiser is usually used in an amount 0.1 to 50% preferably 5 to 30% by weight based on the starch and the lubricant 0.01 to 10% by weight based on the starch. Other possible additives include flow improvers, antistatic agents and stabilisers.

The invention will now be illustrated by reference to the following Example.

Example

The extruder used was provided with a feed inlet hopper for the starch, an inlet into the extruder for water adjacent to the starch inlet, an exit die to extrude product in the shape of a rod and a port immediately adjacent to the exit die to which a vacuum could be applied.

The starch fed to the extruder contained 2.6% by weight water based on starch and 30% by weight glycerol based on starch. Water was added to the extruder so that the amount of water in the mixture in the extruder barrel was 10% by weight based on starch. A vacuum was applied to the port adjacent to the exit die and water removed from the mixture so that the product leaving the extruder die contained 0.8% by weight water based on starch. The extruded product was a hard, brittle, transparent rod which was thermoplastic. When the super dry starch was used without the addition of water to the extruder the extruder rapidly seized and was found to be chocked with an ungelatinised white powder. When normal starch containing about 12% by weight water was used as the feedstock, the extruded product was opaque.

The process described above was repeated successfully using smooth pea starch (34% amylose) and high amylose maize starch (50% amylose). The product produced from high amylose pea starch (74% amylose) however although transparent was found to contain white particles of ungelled starch.

Satisfactory extruded products were also produced when the glycerol was replaced by equivalent amounts of erythritol, sorbitol, 1,4-butane diol and pentaerythritol respectively.

We claim:

1. In a process for extruding or injection molding a starch-containing composition comprising feeding the composition either to an extruder which extrudes the composition through a die or to an extruder forming a part of an injection molding machine which injects the composition into a mold, the improvement which provides a substantially transparent product by (a) feeding to the extruder a starch-containing composition in which the starch contains less than 5% by weight water, based on the starch,
    (b) adjusting the water content of the starch in the barrel of the extruder in the range of 5 to 20% by weight based on the weight of the starch by adding water to the starch immediately before the starch is fed to the extruder or by feeding water directly to the extruder itself, and
    (c) removing water from the composition immediately before the composition leaves the barrel of the extruder, so that the water content of the composition passing through the die and/or entering the mold is less than 3% by weight of the starch.

2. A process as set forth in claim 1 in which the starch used in step (a) contains between 2 and 3% by weight water based on the starch.

3. A process as set forth in any one of claims 1 and 2 in which the water content in step (b) is in the range 7 to 15% by weight of the starch.

4. A process as set forth in any one of claims 1 and 2 in which the water content is controlled in step (b) by feeding water directly to the extruder.

5. A process as set forth in any one of claims 1 and 2 in which the water content of the composition leaving the barrel of the extruder in step (c) is less than 1% by weight of the starch.

6. A process as set forth in any one of claims 1 and 2 in which the starch-containing composition contains a plasticizer for the starch.

7. A process as set forth in claim 6 in which the plasticizer is selected from the group consisting of polyethylene glycol, glycerol, sorbitol, erythritol, propylene glycol, pentaerythritol and glycerol esters.

8. A process as set forth in claim 6 in which the amount of plasticizer is 0.1 to 50% by weight of the starch.

9. A process as set forth in any one of claims 1 and 2 in which the starch-containing composition contains a lubricant.

10. A process as set forth in claim 9 in which the lubricant is selected from the group consisting of lipid and metal stearate.

11. A process as set forth in claim 9 in which the amount of lubricant is 0.01 to 10% by weight of the starch.

* * * * *